United States Patent Office 3,095,444
Patented June 25, 1963

3,095,444
PREPOLYMERS OF ACETYL TRIALLYL CITRATE
Peter J. Borchert, Elkhart, Ind., assignor to Miles Laboratories, Inc., Elkhart, Ind., a corporation of Indiana
No Drawing. Filed Nov. 25, 1960, Ser. No. 71,449
17 Claims. (Cl. 260—484)

This invention relates to the polymerization of acetyl triallyl citrate. More particularly this invention relates to the prepolymerization of acetyl triallyl citrate, that is, polymerization to an extent short of that required for the production of solid thermosetting polymers. Prepolymerization is a desirable technique for providing a material capable of further polymerization in a form which is easy to handle and the polymerization of which is readily accomplished.

It is well known to polymerize unsaturated esters of monobasic and polybasic organic carboxylic acids. The products obtained by such polymerizations are thermosetting polymers having a wide variety of industrial applications. Techniques for the polymerization of unsaturated esters, such as allyl esters, generally involve contacting the monomeric ester with a polymerization catalyst generally of the peroxidized type such as peracetic acid or perbenzoic acid or other similar compounds, and heating the mixture of monomer and catalyst for periods of from one to one hundred hours at temperatures of from about room temperature to 200° C. or higher. These procedures, however, involve the use of special equipment and require careful control of the heat involved during polymerization which is a difficult and time consuming operation.

Allyl polymerizations involve three constituent processes—chain initiation, chain propagation, and chain termination. The initiation reaction may be thermal, photochemical or catalytic. Catalytic initiation is most commonly used. In allyl polymerizations larger amounts of polymerization catalyst are required than in the case of polymerizations such as vinyl polymerizations because of the tendency of the growing polymer chains to terminate due to degradative chain transfer.

While for ordinary bulk polymerizations, including allyl polymerizations, benzoyl peroxide or other catalysts such as tertiary butyl peroxide or peroxycarbonates, as well as Friedel-Crafts types of catalysts, for example, a boron trifluoride-diethyl ether complex, are generally satisfactory, in the case of the prepolymerization of acetyl triallyl citrate, these catalysts have been found to be generally unsatisfactory due to an uncontrollable rate of chain propagation and the formation of a high degree of cross-linkage during polymerization. Thus, the prior art procedures for bulk polymerizations are not readily adaptable to the prepolymerization of acetyl triallyl citrate.

Accordingly, it is a principal object of this invention to provide a process for the prepolymerization of acetyl triallyl citrate.

Another object of this invention is to produce prepolymerized resins of acetyl triallyl citrate in which some of the double bonds have been reacted in the formation of partially polymerized materials of relatively low molecular weight.

Another object of this invention is to provide a catalyst system which is suitable for the prepolymerization of acetyl triallyl citrate.

Still another object of this invention is to provide a convenient and rapid means for following the progress of the prepolymerization of acetyl triallyl citrate.

Yet a further object is to provide a process which may be used to stop polymerization of acetyl triallyl citrate at any desired level.

Other objects and advantages of this invention will become apparent during the course of the following detailed disclosure and description.

The objects of the instant invention are accomplished by means of a process which generally comprises the prepolymerization of acetyl triallyl citrate monomer in the presence of a hydrogen peroxide catalyst and the stopping of the prepolymerization reaction at the desired prepolymerization level.

More specifically, acetyl triallyl citrate is heated in the presence of a hydrogen peroxide catalyst for a period of time sufficient to give the desired degree of perpolymerization. When this desired degree is achieved the prepolymerization is stopped and the resulting prepolymer maintained in that state as long as desired. The prepolymer, which is in a highly viscous liquid state, can be further polymerized by mere heating to yield a solid plastic material when desired.

As the prepolymerization catalyst it is preferred to use aqueous hydrogen peroxide, since as stated above the prepolymerization of acetyl triallyl citrate using conventional peroxide type catalysts such as benzoyl peroxide or tertiary butyl peroxide is not particularly satisfactory due to the difficulties encountered in attempting to control the polymerization. Aqueous hydrogen peroxide, on the other hand, has been found to allow prepolymerization to proceed at a much slower rate than has heretofore been possible. Various concentrations of hydrogen peroxide may be used. An especially preferred concentration is the commercially available 50% aqueous solution. The catalyst is used in an amount of from about 0.25% to 1% by weight of the monomer, based on 100% hydrogen peroxide. This corresponds to an amount, for the preferred 50% aqueous hydrogen peroxide catalyst, of from about 0.5% to 2% by weight of the monomer.

The prepolymerization reaction is generally found to be completed in from about one hour to three hours at reaction temperatures of between about 100° C. and 160° C. A particularly desirable range of temperatures for prepolymerization has been found to be from about 105° C. to 115° C.

Prepolymerization conducted as described above may be allowed to proceed until the desired degree of prepolymerization is attained. Generally the prepolymerization is stopped while the product is still in the liquid state, although it is possible to halt the polymerization after the product has become solid and still have a prepolymer rather than a cross-linked thermosetting resin. The attainment of the desired degree of prepolymerization may be estimated by observation of the viscosity of the prepolymerization mixture or an exact measurement of a physical or chemical property of the mixture, such as its refractive index, viscosity or percent unsaturation, may be taken in order to determine the degree of prepolymerization. For example, a particularly satisfactory and useful technique is to observe the increasing refractive index of the prepolymerization mixture, since the refractive index varies with the increasing degree of prepolymerization. In a preferred embodiment of this invention the prepolymerization is stopped when the refractive index reaches about $n_D^{20}$ 1.4700. At this value the prepolymer is still in the liquid state and may be maintained at this degree of prepolymerization for extended periods of time by means of the use of a suitable inhibitor which stabilizes the prepolymer during storage. A number of such polymerization inhibitors are well known in the art and any of these may be used for this purpose, for example hydroquinone and t-butyl catechol. One that has been found to be particularly satisfactory for use is a 0.01% solution of hydroquinone.

When the monomer has been prepolymerized to give a prepolymer having the desired molecular weight and other characteristics the prepolymerization reaction, as stated above, is stopped. Stoppage of the prepolymerization reaction may be conveniently accomplished in a number of different ways. For example the prepolymerization mixture may be simply cooled from the prepolymerization temperature down to below about 80° C. This cooling of the prepolymerization mixture has been found effective to stop the prepolymerization. Another means of stopping the prepolymerization is by the use of a polymerization inhibitor such as hydroquinone, t-butyl catechol, methylene di-β-naphthol and the like. When the prepolymerization is stopped and the prepolymers stored at room temperature for extended periods of time the degree of prepolymerization is observed to remain constant as determined for example by means of the refractive index of the prepolymer. It is possible, as stated above, to store the prepolymer until such time as it is to be used, at which time the prepolymer may be caused to further polymerize by the application of heat. The starting material of the present invention, that is, the acetyl triallyl citrate monomer, may be conveniently prepared by esterifying citric acid with allyl alcohol followed by acetylation with acetic anhydride in the presence of an acid catalyst, as described in application Serial No. 617,229, copending herewith and assigned to the instant assignee.

The invention will be better understood by reference to the following examples which are included for purposes of illustration and are not to be construed as in any way limiting the scope of this invention which is defined in the appended claims.

EXAMPLE I

Acetyl triallyl citrate was charged to a resin kettle in an amount of 1000 g. and heated to 105° C. There was then added 10 ml. of 50% aqueous hydrogen peroxide. The mixture was heated with stirring for a total of 2½ hours at between 110° C. and 115° C. during which time the mixture became steadily more viscous. The refractive index was measured every 15 minutes and when it had attained the value $n_D^{20}$ 1.4739 a quantity of 0.1 g. of hydroquinone was added to halt further polymerization. The mixture was allowed to cool to 75° C. by stirring for 15 minutes. At the end of this time the refractive index was $n_D^{20}$ 1.4745. No change in refractive index was observed upon standing at room temperature for 30 days. The prepolymer obtained was a clear, colorless viscous liquid having the specifications shown in Table 1.

Table 1

|  | Monomer | Prepolymer |
|---|---|---|
| Acid No. | 4.9 | 7.8 |
| Saponification No. | 635–628 | ---------- |
| Color (APHA) | 27 | 23 |
| Ref. Index ($n_D^{20}$) | 1.4650 | 1.4745 |
| Water (percent) K. F. | 0.5 | 0.2 |
| Sulfated Ash | Nil | Nil |
| Unsaturation (percent) | 97 | 87.5 |
| Viscosity (cps.) | 32 | 525 |

It should be noted that the process of this invention unexpectedly results in a pronounced change in the refractive index and viscosity of the polymerization mixture with only a relatively small change in percent unsaturation, that is, with a small change in degree of polymerization. The product which results is a much more easily handled material than the monomer.

The following example illustrates the preparation of a prepolymer of acetyl triallyl citrate using temperature reduction to stop the polymerization of the acetyl triallyl citrate.

EXAMPLE II

There was charged to a resin kettle 1000 g. of acetyl triallyl citrate. The acetyl triallyl citrate was heated to 105° C. and 10 ml. of 50% hydrogen peroxide added.

The resulting mixture was heated under stirring at 105° C. to 110° C. for a total of 4 to 4½ hours. During this time the mixture became more and more viscous. The refractive index of the polymerized mixture was measured at 15 minute intervals and polymerization was stopped when the refractive index had reached $n_D^{20}$ 1.4740 by allowing the mixture to cool to 72° C. within 10 minutes. After standing for 30 days at room temperature the refractive index remained at $n_D^{20}$ 1.4740. The prepolymer obtained was a clear, colorless, viscous liquid and had the specifications shown in Table 2.

Table 2

|  | Monomer | Prepolymer |
|---|---|---|
| Acid No. | 4.5 | 8.2 |
| Saponification No. | 635 | ---------- |
| Color (APHA) | 27 | 20 |
| Ref. Index ($n_D^{20}$) | 1.4635 | 1.4740 |
| Water (percent) K. F. | 0.5 | 0.2 |
| Sulfated Ash | Nil | Nil |
| Unsaturation (percent) | 97 | 85.5 |
| Viscosity (cps.) | 32 | 525 |

The following example illustrates a large scale prepolymerization of acetyl triallyl citrate using the process of this invention.

EXAMPLE III

Following the procedure described in Example I, 30 lb. of acetyl triallyl citrate and 150 ml. of 50% hydrogen peroxide were heated with stirring at 110° C. to 118° C. for 5 hours. Polymerization was stopped at the end of this time by adding 0.003 lb. of hydroquinone. The prepolymer obtained had the specifications shown in Table 3.

Table 3

|  | Monomer | Prepolymer |
|---|---|---|
| Density g./ml. | 1.14 | 1.16 |
| Acid No. | 9.1 | 15.5 |
| Saponification No. | 650.5 | ---------- |
| Color (APHA) | 130 | 100 |
| Ref. Index ($n_D^{20}$) | 1.4635 | 1.4722 |
| Water (percent) K. F. | 0.1 | 0.1 |
| Sulfated Ash | Nil | Nil |
| Unsaturation (percent) | 98.1 | 81.5 |
| Viscosity (cps.) | 32 | 525 |

It can thus be seen that acetyl triallyl citrate can be readily and controllably converted into useful prepolymers according to the process of this invention.

In summary, novel prepolymers of acetyl triallyl citrate are provided by a process which consists in the use of a hydrogen peroxide catalyst to polymerize the acetyl triallyl citrate to the desired extent and the stopping of the polymerization at the degree desired before thermosetting polymers have been produced.

Other embodiments than those specifically described may of course be used in the practice of this invention and are intended to be included within the scope thereof, which is defined in the appended claims.

What is claimed is:

1. A process for the preparation of prepolymers of acetyl triallyl citrate which comprises prepolymerizing acetyl triallyl citrate in the presence of from about 0.25% to 1.0% of hydrogen peroxide by weight of said acetyl triallyl citrate at a temperature of from about 100° C. to 160° C. for from about 1 hour to 3 hours and stopping the prepolymerization when the desired degree of prepolymerization is reached.

2. A process according to claim 1 wherein the prepolymerization is stopped while the prepolymer is still liquid.

3. A process according to claim 1 wherein the prepolymerization is stopped by cooling the polymerization mixture below about 80° C.

4. A process according to claim 1 wherein the prepolymerization is stopped by adding a polymerization inhibitor to the polymerization mixture.

5. A process according to claim 4 wherein said polymerization inhibitor is hydroquinone.

6. A process for the preparation of prepolymers of acetyl triallyl citrate which comprises prepolymerizing acetyl triallyl citrate in the presence of from about 0.25% to 1.0% of hydrogen peroxide by weight of said acetyl triallyl citrate at a temperature of from about 100° C. to 160° C. for from about 1 hour to 3 hours and stopping the prepolymerization when the refractive index ($n_D^{20}$) of the reaction mixture reaches about 1.4700.

7. A process according to claim 6 wherein the prepolymerization is stopped by cooling the polymerization mixture to a temperature below about 80° C.

8. A process according to claim 6 wherein the prepolymerization is stopped by adding a polymerization inhibitor to the polymerization mixture.

9. A process according to claim 8 wherein said polymerization inhibitor is hydroquinone.

10. A process according to claim 6 wherein said hydrogen peroxide is used as 50% aqueous hydrogen peroxide.

11. A prepolymer of acetyl triallyl citrate having a refractive index within the range of from about $n_D^{20}$ 1.4700 to $n_D^{20}$ 1.4750, a percentage of unsaturation of from about 80% to 90%, and a viscosity of about 525 centipoises.

12. A process for the preparation of prepolymers of acetyl triallyl citrate which comprises prepolymerizing acetyl triallyl citrate in the presence of from about 0.25% to 1% of hydrogen peroxide by weight of said acetyl triallyl citrate at a temperature of from about 105° C. to 115° C. for from about 1 hour to 3 hours, and stopping the prepolymerization when the refractive index ($n_D^{20}$) of the reaction mixture reaches a value in the range of from about 1.4700 to 1.4750.

13. A process according to claim 12 wherein the prepolymerization is stopped by cooling the polymerization mixture to a temperature below about 80° C.

14. A process according to claim 12 wherein the prepolymerization is stopped by adding a polymerization inhibitor to the polymerization mixture.

15. A process according to claim 12 wherein the prepolymerization is stopped by adding hydroquinone as a polymerization inhibitor to the polymerization mixture.

16. A process according to claim 12 wherein said hydrogen peroxide is added as 50% aqueous hydrogen peroxide.

17. A prepolymer of acetyl triallyl citrate having a refractive index within the range of from about $n_D^{20}$ 1.4700 to $n_D^{20}$ 1.4750 and a percentage of unsaturation of from about 80% to 90%.

References Cited in the file of this patent

UNITED STATES PATENTS

| | | |
|---|---|---|
| 2,811,551 | Coffman et al. | Oct. 29, 1957 |
| 3,025,271 | Borchert | Mar. 13, 1962 |